United States Patent [19]

Katsekas

[11] 4,387,316
[45] Jun. 7, 1983

[54] DYNAMOELECTRIC MACHINE STATOR WEDGES AND METHOD

[75] Inventor: James C. Katsekas, Windham, N.H.

[73] Assignee: General Electric Company, Lynn, Mass.

[21] Appl. No.: 307,007

[22] Filed: Sep. 30, 1981

[51] Int. Cl.³ .............................................. H02K 3/48
[52] U.S. Cl. ...................................... 310/214; 29/596
[58] Field of Search ....................... 310/214, 215, 194; 29/596, 598

[56] References Cited

U.S. PATENT DOCUMENTS

| | | | |
|---|---|---|---|
| 2,723,358 | 11/1955 | Holmgren | 310/214 |
| 3,139,550 | 6/1964 | Geer | 310/214 |
| 3,665,576 | 5/1972 | Nordmann et al. | 29/205 |
| 4,015,156 | 3/1977 | Johrde | 310/214 |
| 4,149,101 | 4/1979 | Lesokhin et al. | 310/214 |
| 4,179,635 | 12/1979 | Beermann | 310/214 |
| 4,200,818 | 4/1980 | Ruffing et al. | 310/214 |

Primary Examiner—R. Skudy
Attorney, Agent, or Firm—James W. Mitchell

[57] ABSTRACT

In a dynamoelectric machine having a rotating field and a stationary stator core, electrical conductors are contained within axially-extending radial slots which are part of the stator core construction. The electrical conductors for stator bars are subject to electromagnetic forces and thermal cycling effects which, over a period of time, tend to cause the stator bars to become loose within their slots. The invention is an improved wedging system which provides both an immediate and residual force on the stator bars which holds the bars in place even after certain settlements have taken place. Further, it is possible to determine the amount of force applied initially to the stator bars by the wedging system and any residual force after a period of operation.

6 Claims, 4 Drawing Figures

DYNAMOELECTRIC MACHINE STATOR WEDGES AND METHOD

BACKGROUND OF THE INVENTION

This invention relates to large dynamoelectric machines and, in particular, to an improved wedging system for retaining conductor bars in stator core slots.

Large dynamoelectric machines such as electrical generators employ a laminated stator core for transmitting induced voltages to the generator terminals through stator conductor bars. The cores are usually made by assembling already-slotted punchings or laminations into an annular housing for later containing the generator rotor. The slotted punchings, when assembled, define axially-extending radial slots which terminate at the radially inner-circumference of the stator annulus. The stator bars, or conductors, are laid in the radial slots and a wedging system is used to hold the bars in place against electromagnetic forces present when the machine is operating. If the wedging system is not effective, conductor insulation may be damaged in the ensuing vibration, ultimately leading to a forced outage of the generator.

One example of a generator wedging system is shown in U.S. Pat. No. 3,139,550 to Geer and assigned to the assignee of the present invention. That patent describes, in detail, the application of a pressure wedge and a "herringbone" wedge to a stator slot for retaining the conductor bars in place in the stator slot. The herringbone portion of the wedge is used to discourage the herringbone wedge from "backing out" of the slot. The patented Geer wedge system cannot compensate for radial settlements of the stator bars in the stator core slots which occur after an extended period of dynamoelectric machine use. According to the present invention, this is because there is a lack of flexibility in the wedging system to accommodate residual shifting of the stator bars. The wedges may be retightened but this is a time-consuming major overhaul. Hence, there is a clear need within the industry to produce a stator wedge which will provide a residual tightening or follow-up effect to accommodate subsequent bar movement and settling.

Certain ripple spring configurations have been used in combination with the aforedescribed patented wedging system, but it has been found that any improved result is also diminished over time because of temperature creep within the ripple spring system. Such ripple springs have been positioned along the sides of the conductor bars so as to inhibit movement in the radial direction and ground the coils in the slots. U.S. Pat. No. 3,665,576 to Nordmann and Schmidt describes the problems associated with wedging systems and further suggests a wedge and associated hydraulic pump for applying such a wedge so that sufficient residual force is available after aging to avoid bar movement. The patent does not suggest the use of a residual spring force but rather advocates the use of an "over-force" for applying stator wedges to the stator bars. The Nordmann et al. patent discusses not only the importance of applying an initial overforce so as to leave residual pressure after aging, but also the importance of knowing how much overforce is being applied so as to insure its adequacy while avoiding the problem of broken parts. There is, then, a clear need to be able to calibrate the force which is applied by the wedging system to the conductor bars. Moreover, there is a need to know how much residual force is left applied to the conductor bars in order to determine its adequacy.

Since the environment of an electrical generator is relatively compact, there is a need to keep the mechanism for effecting construction or repair relatively simple and uncomplicated. Since there are hundreds of such stator slot wedges contained within a typical generator, it is important that the construction and method of applying slot wedges be as economical, effective, and non-time-consuming as possible.

SUMMARY OF THE INVENTION

The invention is an improved stator wedge construction and method of applying the construction to the stator core itself so that it is possible to determine the amount of force applied to the stator bars both initially and after a period of some use. In its broadest sense, the invention comprises a means for applying a spring loading on a so-called pressure wedge so that as the stator bars shift and settle, a residual spring force will take up the slack in the pressure being exerted upon the pressure wedges. The spring force is obtained from a "curling" wedge, so named because as it is driven into place, the edges of the wedge at either end curl in the radial direction to produce a measurable deflection proportional to the radial force being applied to the wedges. The curling wedge is characterized by an elongated body portion which bears against the pressure wedges and a dovetail wedge member which engages the curling wedge while mounting in the stator dovetail slots.

OBJECTS OF THE INVENTION

It is an object of this invention to provide a stator wedging system which will retain stator bars securely for both the initial set-up and follow-up during machine use.

It is another object of the invention to provide a stator wedging system wherein the radial force applied to the pressure wedges can be measured.

Another object of the invention is to provide a stator wedging system which obviates the need for the "herringbone" dovetail wedge construction to prevent backsliding of the dovetail wedges.

The novel features believed characteristic of the present invention are set forth in the appended claims. The invention itself, however, together with further objects and advantages thereof, may best be understood with reference to the following description taken in connection with the drawings.

DETAILED DESCRIPTION OF THE INVENTION

Figure 1:
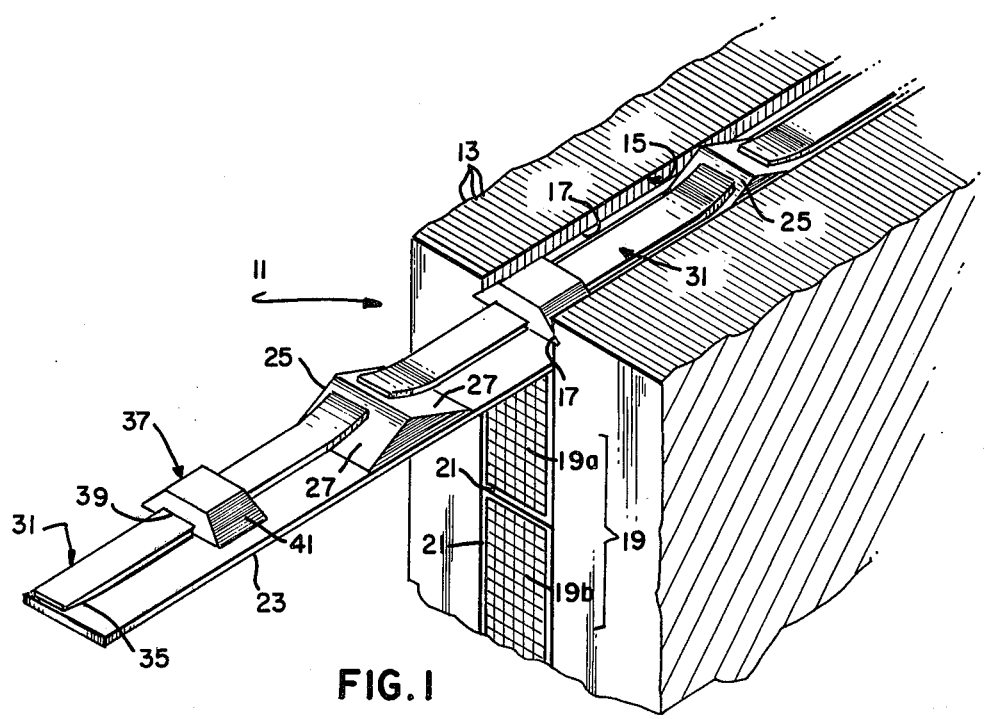
FIG. 1 is an isometric drawing of a lower portion of a generator stator showing the application of the present invention to the dynamoelectric machine.

FIG. 1 of the drawing shows a lower portion of a dynamoelectric machine stator core 11. The dynamoelectric machine has a rotor (not shown) and a stator core, the latter being an annular structure which surrounds the rotor when the rotor is assembled within the dynamoelectric machine. The stator core is assembled from a plurality of slotted punchings or laminations 13 which are pressed together in a well-known fashion and mounted on key bars (not shown). The stator core is formed with radial slots 15 spaced circumferentially around the inner annulus perimeter (only one shown) and which extend along the axial length of the stator core and which terminate at their radially inner portions in a dovetail slot 17, well known in the art. The conductors 19 comprise lightly insulated conductor strands (not shown) including radially inner and outer bars 19a and 19b, respectively. The conductors or conductor bars include electrical insulation 21 wrapped about the perimeter portions.

Figure 2:
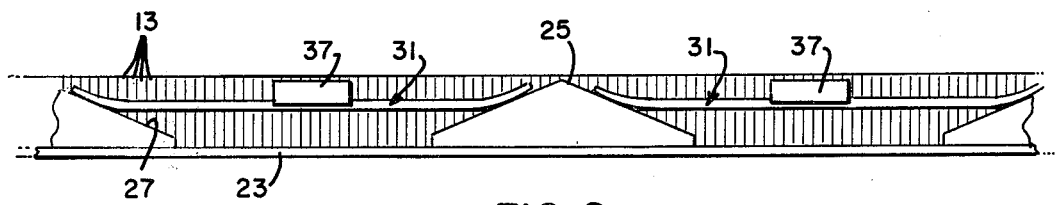
FIG. 2 is a side view of the present invention as applied to a dynamoelectric machine stator core slot.

In conjunction with the foregoing and referring to FIG. 2, a filler strip 23 extends axially (longitudinally) along the slot radially inward from bar 19a. A number of pressure wedges 25 are introduced into the slot 15 and spaced apart along the axial length of the slot 15 so as to bear radially against the insulating filler strip 23. The pressure wedges are formed with oppositely-facing inclined surfaces 27 which facilitate the assembly of the stator bar wedging system. The material of the wedges 25 is preferably of high-strength insulating material which can be cut or molded to the shapes which are shown and described. The wedges are preferably formed of a molded resinous compound employing a suitable filler to add strength or can be made from many commercially-obtainable materials such as "Textolite" (a registered trademark of the General Electric Company).

Figure 3:
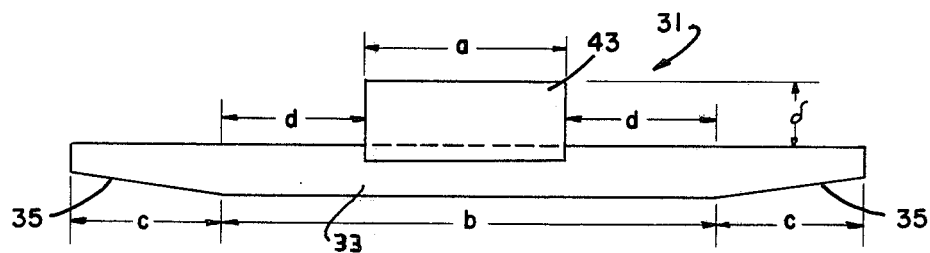
FIG. 3 is a side view of just the curling wedge and the dovetail wedge.

With reference to the foregoing FIGS. 1 and 2 and now FIG. 3, the preferred embodiment of the present invention includes an elongated curling wedge 31 having a longitudinally-extending elongated body portion 33 terminating with inclined surfaces 35 at each end for mating with the inclined surfaces on the pressure blocks. The curling wedge 31 is preferably made from 1007 Scotchply available from 3M Company or G-11 glass available from the Spaulding Company.

Cooperating with the curling wedge, there is a dovetail wedge 37 joined in place with the curling wedge including a slot portion 39 formed in the dovetail wedge through which the curling wedge may be inserted during assembly. The sides 41 of each dovetail wedge are inclined toward one another so that they may be securely held within the dovetail slots 17 of the stator core. The dovetail wedge 37 is preferably constructed from a Kevlar-glass composite. In FIG. 3, the axial length "a" of the dovetail wedge 37 is less than the entire axial length of the curling wedge and, further, is preferably less than the axial length "b". This will promote the deflection of the curling wedge relative to the dovetail wedge and facilitate its placement into the stator core slot.

Figure 4:
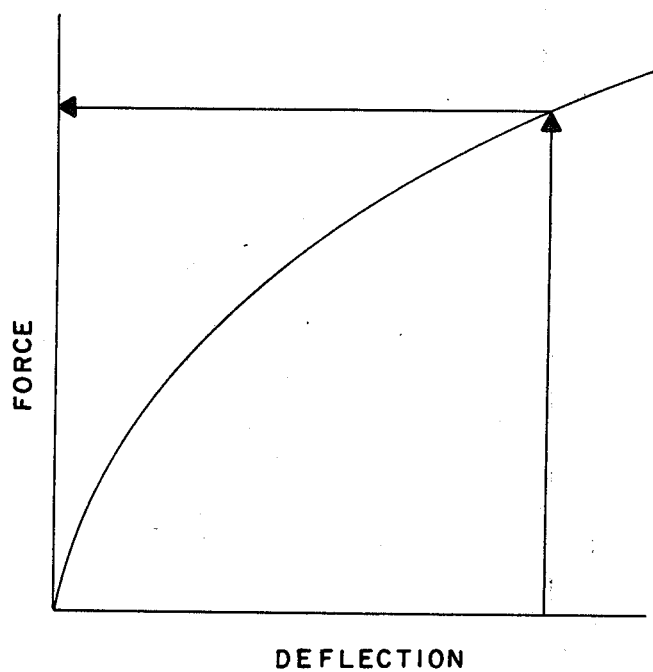
FIG. 4 is a force/deflection curve used in practicing the method of this invention.

The method of practicing the present invention is readily ascertainable from the following description and with reference to the drawings including FIG. 4. The steps include inserting the stator bars into the stator slots and mounting the filler strip contiguous with the radially inner stator bar 19a. Thereafter, the method continues by inserting a pressure block into place along the axial length of the slot so that it bears against the filler strip. The next step includes inserting the dovetail wedge into the dovetail slot and sliding it along the slot to an appropriate position and then inserting the curling wedge in place until one end contacts an inclined face of the pressure wedge. The dovetail wedge should be located approximately midway along the length of the curling wedge. It is pointed out that the curling wedge and dovetail wedge could be made in one piece if desired and still accomplish a function similar to that according to the present invention. However, it is easier to fabricate the two different wedges; i.e., the curling wedge and the dovetail wedge separately and there is no substantial reason for joining the two. Hence, the invention is preferably applied in two parts. Also it is generally felt that the dovetail block should be positioned midway between the two pressure blocks or intermediate the ends of the curling wedge so that uniform pressure is applied at both inclined surfaces of the pressure wedge.

After the pressure wedge, curling wedge and dovetail wedge are approximately aligned, a second pressure wedge is driven axially along the slot until it contacts the free end of the curling wedge. Thereafter, a mallet and driver are used to deflect the ends of the wedge relative to a common datum such as the upper surface 43 of the dovetail wedge. The greater the deflection, the greater the applied force. This is illustrated in the graph depicted in FIG. 4.

The relationship between force and deflection for FIG. 4 is given by the following expression with reference to FIG. 3:

$$EI = (F/24)(3c^3 + 8d^3 + 12c^2d + 18cd^2 + 6c^2a + 12d^2a + 18cda)$$

For a standard curling wedge where $c = d = 1''$ and $a = 1.38''$, this formula reduces down to:

$$= (4.04 F/EI)$$

Knowing the bar force of the stator bar, the residual deflection necessary after initial settling can be calculated assuming or measuring the actual initial settlement. Using the representative graph shown in FIG. 4 and as shown by the directional arrows, the residual deflection can be measured to determine the force being exerted by the curling wedge. If this exceeds the bar force, then it is probable that no bar vibration will occur.

In applying the present invention to a dynamoelectric machine stator core, the following steps may be taken:

determining the actual bar force;

measuring a deflection in the curling wedge which exceeds the deflection corresponding to the actual bar force.

In analyzing the stator wedge system for residual force, the steps comprise:

measuring the residual deflection of the curling wedge;

determining the residual force in the curling wedge;

determining whether the residual force exceeds the actual bar force.

Finally, it is pointed out that since the premise of the invention is that the stator wedge system is self-tightening, the need for the "herringbone" construction to retain wedges in the slots will be obviated since the wedges will be held in place by the spring action of the curling wedge.

While there has been shown what is considered to be the preferred embodiment of the invention, it is, of course, understood that various other modifications may be made therein by those skilled in the art. It is intended to cover in the appended claims all such modifications which fall within the true spirit and scope of the invention.

What is claimed is:

1. A wedging system for retaining conductor bars in conductor bar slots in a dynamoelectric machine, said wedging system comprising:
   pressure wedges for providing a radial force against the conductor bars;
   a curling wedge positioned between each pair of pressure wedges in the axial direction; and,
   a dovetail wedge bearing against the curling wedge and located approximately midway between the ends of the curling wedge.

2. The wedging system recited in claim 1 wherein the dovetail wedge further comprises an axially extending slot portion whereby the dovetail wedge straddles the curling wedge.

3. The wedging system recited in claim 1 wherein the axial length of the dovetail wedge is less than one-half the axial length of the curling wedge.

4. An improved stator bar wedging system for a dynamoelectric machine of the type having a stator core formed with circumferentially spaced radial slots extending along the axial length of the stator core; conductor bars being disposed in the stator core slots; the stator core slots each having a wedge-shaped cross section at its radial inner end; wherein the improvement comprises:
   pressure wedges spaced apart in the axial direction for providing a radial force against the conductor bars;
   a curling wedge positioned between each pair of pressure wedges in the axial direction and bearing against the pressure wedges; and,
   a dovetail wedge bearing against the curling wedge and located approximately midway between the ends of the curling wedge.

5. The improvement recited in claim 4 wherein the dovetail wedge further includes an axially extending slot portion whereby the dovetail wedge straddles the curling wedge.

6. The improvement recited in claim 4 wherein the axial length of the dovetail wedge is less than one-half the axial length of the curling wedge.

* * * * *